M. C. JEFFERS.
Corn Husker.

No. 108,484. Patented Oct. 18, 1870.

United States Patent Office.

MILTON C. JEFFERS, OF NEW YORK, N. Y.

Letters Patent No. 108,484, dated October 18, 1870; antedated October 15, 1870.

IMPROVEMENT IN CORN-HUSKING MACHINES.

The Schedule referred to in these Letters Patent and making part of the same.

*To all whom it may concern:*

Be it known that I, MILTON C. JEFFERS, of the city and State of New York, have invented a certain new and useful Improvement in Combined Fodder-Cutter and Corn-husking Machines; and the following is hereby declared to be a full and correct description of the same.

My present invention is an improvement upon that for which Letters Patent No. 74,370 were granted to me February 11, 1868. In said Letters Patent the corn and stalks were fed by hand to the roller B and cylinder of knives C, and the stalks and leaves passed through between B and C, but the ears of corn were pressed back and passed to the trough L and husking-rollers H.

Springs between the husking-rollers and the cover or cap to said rollers kept the ears of corn to the husking-rollers, and pins were employed to slit or tear the husks.

When the machine was used as a fodder-cutter, the material was supplied to the stationary table G and fed by hand to the cutter, the said cutter-cylinder being turned end for end.

My improvement on said invention relates to means for feeding into the machine separate ears of corn, as they are frequently pulled from the stalks standing in the field, and consists in a hopper and endless feeding-apron, to which apron motion is given to convey the ears to the husking mechanism, and, by the use of which, the roller B and cylinder of knives C in aforesaid patent can be dispensed with when the machine is used as a husker, and, when said machine is employed as a fodder-cutter, the said endless apron (but without the hopper) may be used to feed the fodder to the cutter.

I hinge the cover of the husking-rollers so that said cover will act, by its weight, to keep the ears of corn to said rollers, and dispense with the springs K of my aforesaid patent.

In place of using the pins $b$ of said patent, I employ a roller or shaft, placed immediately under and parallel with the rollers H, and said roller or shaft is provided with cutters or projecting points that tear and split the husks as passed through between said rollers, so that they may be in a condition for use in bedding, upholstery, &c.

In the drawing—

Figure 2:
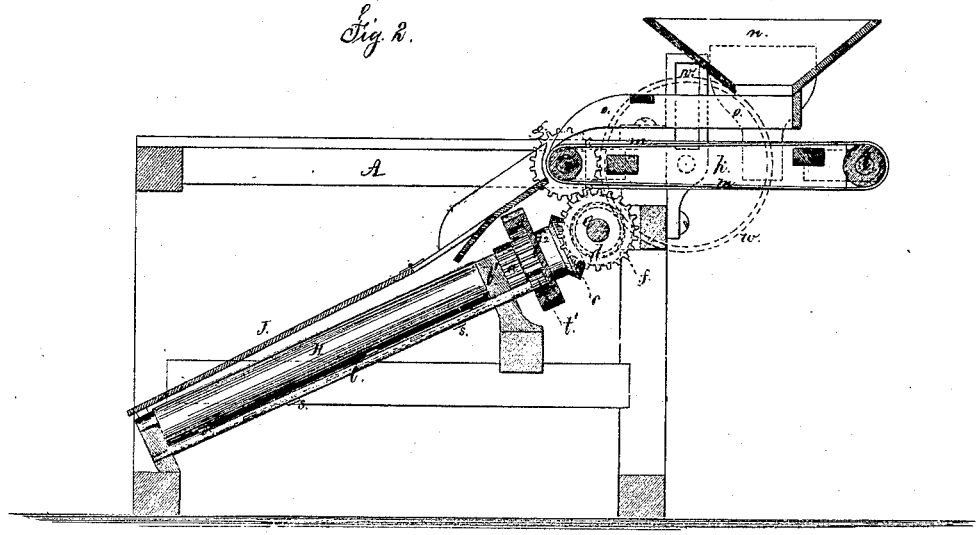
Figure 2 is a vertical longitudinal section of the same at the line $x\,x$, fig. 1.

The frame A and husking or stripping-rollers H H are substantially the same as in aforesaid patent; and I here remark that I have shown in the drawing my machine as provided with two sets of husking-rollers, and, as the operation of each set is the same, I will describe it with reference to one set only.

Figure 4:
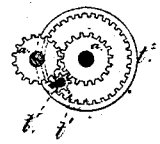

The rollers H are connected by the gears $a$, (see fig. 2 and the detached Figure 4,) and the shaft of one of said rollers is extended beyond the bearing $b'$ and gears $a$, and receives at its end the bevel-gear $c$, which derives its motion from the bevel-gear $d$, shown by dotted lines, fig. 2, on the shaft $e$, and upon this shaft $e$ is the gear $f$, that gives motion to the wheel $g$.

This wheel $g$ is upon a shaft, $i$, mounted in bearings in one end of the frame $k$, and at the other end of said frame is a shaft, $l$.

These shafts $i\,l$ are provided with rollers or drums to receive the feeding-apron $m$.

The frame $k$ is attached removably to the frame A, and held in place by the bolts or screws $m'$.

Above the feeding-apron $m$, and supported by suitable standards, is the hopper $n$, and below the bottom of said hopper guides $o$ extend along above the feeding-apron, to keep the ears of corn upon said apron $m$, and direct them to the trough formed by the incline L and side pieces $p$, and from this trough the corn passes to the rollers H H, to be husked, as in aforesaid patent.

Above the rollers H H is the cover or cap J, and a sufficient space is left between said rollers and cap for the ears of corn. I have shown said cap as hinged to the incline L. Said cover, or cap acts, by its weight, to keep the ears to the rollers, so that the husks will be nipped by said rollers and removed from the ears, but said cap might be fitted to slide vertically and be kept to its proper position by springs or weights.

The husks, as stripped from the ears, are passed through between the rollers H. Immediately under and parallel with said rollers H, I place the roller or shaft $t$, and this shaft is provided with the cutters or projecting points $s\,s$. This roller $t$ revolves very rapidly, and, with its points $s$, almost in contact with the rollers H, and acts to tear and slit the husks into shreds, so that the same can be used for upholstery and other purposes.

The roller $t$ at one end has a pinion, $t^1$, that receives its motion from the internal gear $t^2$, which is on the shaft of one of the rollers H. This arrangement of gearing is shown more clearly in fig. 4.

Figure 1:
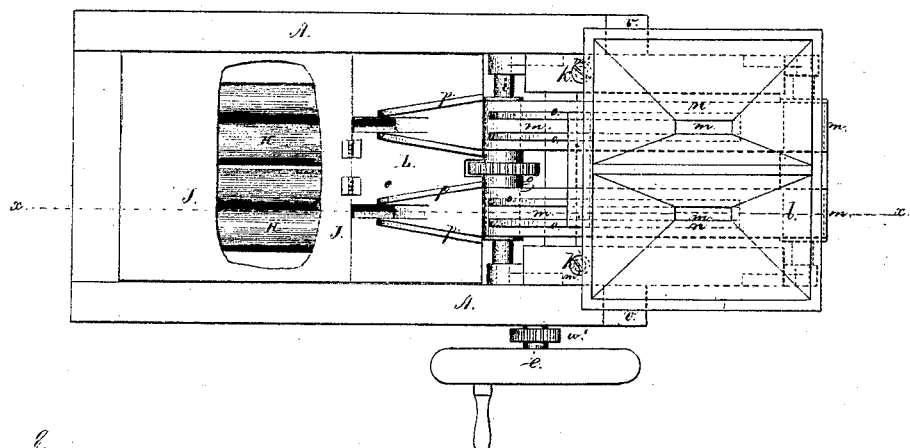
Figure 1 is a plan of my said machine as adapted to husking separate ears of corn.
Figure 3:
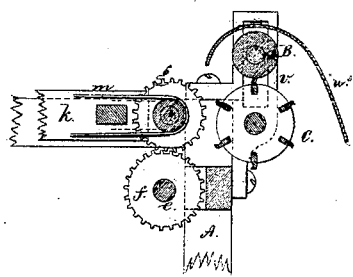
Figure 3 illustrates the manner in which the machine is used as a fodder-cutter.

When said machine is to be used as a fodder-cutter, the hopper $n$ is to be removed from the frame $k$, and said frame $k$ and feeding-apron $m$ removed from its position, figs. 1 and 2, to that shown in fig. 3, and the roller B and cylinder of knives C placed in their usual position in the bearings $v$, and when in that position the wheel $w$, shown by dotted lines in fig. 2, will gear into the pinion $w^1$, fig. 1, and the power, instead of being applied to the shaft $e$, should be applied to the shaft of the cutter C.

The fodder to be cut is placed upon the apron $m$, and by it conveyed to the roller B and knives C, and said belt will receive its motion by the gears $f$ and $g$, as before.

A guard, $w^2$, may be placed as shown in fig. 3, to effectually prevent injury to the attendant.

By this construction my said machine can be adapted, by changing the position of the parts, to husking corn, by throwing the ears loosely into a hopper, or by passing the stalks through the machine for separating the ears and then husking them, or to cutting up fodder, and that without as much risk as heretofore of injury to the person using the machine. Thus my machine can be employed under the varying circumstances that frequently arise in connection with agricultural labor, especially in the South and West, where the ears of corn and husk are usually gathered from the standing stalks in the field.

I claim as my invention—

1. The hopper $n$, guides $o$, and feeding-apron $m$, in combination with the inclined husking-rollers H H, as and for the purposes specified.

2. The revolving shaft $t$ and projections $s$, receiving motion from the internal gear $t^2$, in combination with the husking-rollers H, as and for the purposes specified.

Signed by me this 14th day of March, A. D. 1870.
MILTON C. JEFFERS.

Witnesses:
CHAS. H. SMITH,
GEO. T. PINCKNEY.